United States Patent [19]

Coscia et al.

[11] 4,137,164

[45] Jan. 30, 1979

[54] PROCESS FOR CLARIFYING IRON ORE SLIMES

[75] Inventors: Anthony T. Coscia, South Norwalk; Michael N. D. O'Connor, Norwalk, both of Conn.

[73] Assignee: American Cyanamid Company, Stamford, Conn.

[21] Appl. No.: 792,744

[22] Filed: May 2, 1977

Related U.S. Application Data

[63] Continuation-in-part of Ser. No. 735,577, Oct. 26, 1976, abandoned.

[51] Int. Cl.² ............................................. B01D 21/01
[52] U.S. Cl. ................................................... 210/54
[58] Field of Search ............................ 210/10, 52–54; 260/29.4 UA; 526/23, 54

[56] References Cited

U.S. PATENT DOCUMENTS

| | | | |
|---|---|---|---|
| 3,014,896 | 12/1961 | Colwell et al. | 210/54 C |
| 3,023,162 | 2/1962 | Fordyce et al. | 210/54 C |
| 3,578,586 | 5/1971 | Gal et al. | 210/49 |
| 3,864,312 | 2/1975 | Suzuki et al. | 210/54 C |
| 3,897,333 | 7/1975 | Field et al. | 210/54 C |
| 3,907,758 | 9/1975 | Sackmann et al. | 210/54 C |
| 3,943,114 | 3/1976 | Hoke | 210/54 C |
| 3,956,122 | 5/1976 | Coscia et al. | 210/54 C |
| 4,024,328 | 5/1977 | Zweigle | 210/54 C |

*Primary Examiner*—Frank A. Spear, Jr.
*Assistant Examiner*—Peter A. Hruskoci
*Attorney, Agent, or Firm*—William J. van Loo

[57] ABSTRACT

Use of quaternized Mannich bases of low molecular weight polyacrylamides is highly effective in clarification of iron ore slimes.

5 Claims, No Drawings

PROCESS FOR CLARIFYING IRON ORE SLIMES

CROSS-REFERENCE TO RELATED APPLICATIONS

This application is a continuation-in-part of application Ser. No. 735,577 filed Oct. 26, 1976, now abandoned. This application is also related to applications Ser. Nos. 792,745 and 792,746, filed on even date herewith. The first related application deals with the clarification of coal wash water and the second deals with clarification of raw water while the instant application deals with clarifying iron ore slimes.

This invention relates to a secondary recovery process in the settling of mineral ores. More particularly, this invention relates to such a process wherein fines arising in mineral treatment waters are recovered by use of a low molecular weight quaternized dimethylaminomethyl acrylamide polymer.

Recent developments in the field of water-soluble polymers have led to materials that are effective in watertreatment to remove undesirable material suspended therein. The separation of suspended particles from aqueous suspensions thereof is generally referred to as "flocculation". Such general term can include a wide range of aqueous systems varying from a minor amount of inorganic solids in aqueous suspension, such as raw water, to high concentrations of organic wastes in aqueous suspension, such as sewage sludges. Because of this widely diverse nature of the various solids-water systems, the agents provided for such utility are generally provided in a form that offers versatile preformance, i.e., suitable for use with a wide variety of solid-water systems.

For certain solids-water systems, such as raw waters, these polymeric agents are used to clarify the water by removal of inorganic solids suspended therein. For other solids-water systems, such as sewage sludges, the polymeric agents are used primarily to dewater the sludge so that the solids may be readily disposed of without prohibitive amounts of water being associated therewith. These distinct applications of the polymeric agents give rise to different requirements as to the nature of the agents employed.

One teaching with respect to certain prior art flocculants is that, in general, increased effectiveness arises with increased molecular weight of the polymeric agent employed, see U.S. Pat. No. 3,738,945 for example. Another teaching with respect to certain other prior art flocculants is that there is a certain high molecular weight value at which maximum effectiveness occurs and above which effectiveness remains essentially unchanged, see U.S. Pat. No. 3,897,333 for example. Accordingly, one seeking an effective flocculant for the various solids-water systems contemplated by such application of polymeric agents would provide such agent in high molecular weight range.

Typically, polymeric agents that are used in floculation applications have molecular weights in excess of about 200,000, usually in the range of about 500,000 to several million, and in difficult solid-water systems, such as sewage sludges, frequently higher, depending upon the chemical nature of the polymeric agent. Most products that have been available for commercial use have been in the high molecular weight range so as to provide versatile utility in the wide variety of applications in which they are useful. Although the commercial products possess some degree of versatility as to usage, they do not necessarily provide the optimum performance in any given application.

Certain polymeric flocculants can be made directly from suitable reactants, such as reaction products of epichlorohydrin and dimethylamine or free-radical polymerization products of such monomers as diallyldimethylammonium chloride. Other polymeric flocculants may be made by preparing a polymer from a reactive monomer not containing certain desired functionalities and subsequently modifying the pre-formed polymer to provide the functionalities desired. In this procedure, the functionality of the pre-formed polymer can be varied in a number of respects but the degree of polymerization as it affects molecular weight of the modified polymer is determined by the polymer pre-formed.

Acrylamide is a highly reactive monomer that is widely used to provide pre-formed polymers that can be readily modified chemically to provide alternative or additional functionality for specific end-uses. Thus, acrylamide polymers may be controllably hydrolyzed to provide acrylic acid functions on the polymer structure and provide an anionic polymer. Alternatively, formaldehyde and dimethylamine can be reacted with the amide groups of the polymer to provide substituent dimethylaminomethyl functionality thereon and provide a cationic polymer. Because of the high reactivity of acrylamide monomer, however, the pre-formed polyacrylamide used for subsequent chemical modification is usually in the molecular weight range of about 200,000 to 5,000,000, since such is the degree of polymerization normally obtained. To obtain polyacrylamide of molecular weight outside this range, special preparative procedures are necessary. For higher molecular weight polyacrylamides, for example, highly purified monomer is required. Although procedures for obtaining lower molecular weight polyacrylamides are available, use of such techniques is not generally considered with respect to flocculation applications because of the preference for high molecular weight polymers.

The intrinsic viscosity of a polymer is obtained by measuring the viscosity of varying concentrations of the polymer in a specific solvent and extrapolating to a value at zero concentration, which is the value designated as "intrinsic viscosity". The viscosity is the resistance of the liquid forms of the polymer to flow and is a characteristic property measuring the combined effects or adhesion and cohesion. From the intrinsic viscosity can be calculated the molecular weight of a polymer by use of appropriate equations. As is apparent, the intrinsic viscosity-molecular weight relationship of one polymer type will differ from that of another polymer type. Accordingly, the intrinsic viscosity of a polyacrylamide of a specific degree of polymerization will differ from that of a chemically-modified polyacrylamide of the same degree of polymerization. The fact remains, however, that as the molecular weight, or degree of polymerization, of a polymer increases, the intrinsic viscosity thereof also increases in any particular series.

A quaternized dimethylaminomethyl polyacrylamide has been previously disclosed for the treatment of sewage sludges, see U.S. Pat. No. 3,897,333. The useful polymer disclosed is one stated to have an intrinsic viscosity of at least 0.5 deciliters per gram and the examples used to illustrate the invention employ polymers having intrinsic viscosities of 1.0 and 2.5 deciliters per gram. For a quaternized dimethylaminomethyl polyacrylamide containing at least 50 mole percent of such quaternized groups to have an intrinsic viscosity of at least 0.5 deciliters per gram, the pre-formed polyacrylamide must have a molecular weight of about 130,000 as a minimum and to conform to the exemplified species must have a molecular weight of about 350,000 to 1,500,000. The degree of polymerization for such polymers would be at least 1,800 and, as exemplified, from about 5,000 to 20,000. At this range of degrees of polymerization, the polymers of the reference are said to exhibit equivalent performance in dewatering of sewage sludges, regardless of the actual degree of polymerization in such range. Absent any further teaching by the reference, one would be led to believe that the same range of intrinsic viscosities would be the most effective for other flocculation operations.

In accordance with the present invention, there is provided a process for clarifying ore slimes containing up to about 100,000 parts per million of suspended inorganic solids with a particle size of up to about 2 microns which comprises mixing with said slimes from about 0.1 to 1,000 parts per million, based on the solids content of said slimes, of a polyacrylamide having a content of at least about 50 mol percent of amide groups chemically-modified to contain dimethylaminomethyl groups, the dimethylaminomethyl groups being further modified by quaternization with an alkylating agent, the chemically-modified polyacrylamide having an intrinsic viscosity in the range of about 0.1 to 0.6 deciliters per gram measured in 3 molar NaCl at 30° C. to form suspendible flocs from a portion of the solids present, maintaining said suspendible flocs in suspension in said water until a substantial portion of the remaining solids are adsorbed thereto; and thereafter settling the resulting flocs formed.

The process of the present invention employs a polyacrylamide chemically modified to contain certain quaternized dimethylaminomethyl groups and of low molecular weight. Unexpectedly, such polymer type exhibits improved performance in clarifying ore slimes at lower molecular weight values than do other polymer types and offer advantages over higher molecular weight polymers of the same type. Because the highly effective polymers of the present invention are of low molecular weight, numerous advantages arise, which include the following:

1. The polymers used in the process of the present invention develop maximum effectiveness in ore slime clarification at low molecular weight, thus eliminating disadvantages associated with providing high molecular weight polymers.

2. Because preparation of low molecular weight polymers takes less time than does preparation of high molecular weight polymers, greater productivity is obtained for a reactor of given capacity in a specific time period.

3. Because low molecular weight polymers provide low solution viscosity, chemical modification can be achieved at higher polymer concentrations than in the case of high molecular weight polymers.

4. Because chemical modification can be achieved at high polymer concentration chemical modification is more readily and completely effected.

5. Because the polymer of the present invention is provided at high polymer concentration, shipping costs per unit weight of the polymer are reduced.

6. The low molecular weight polymers of the present invention provide smaller absorbent flocs which adsorb additional suspended solids of the ore slimes and provide greater clarification than do high molecular weight polymers which provide larger, non-absorbent flocs.

7. The polymers of the present invention offer cost-performance advantages over other polymeric flocculants because of their processing advantages.

The polymers useful in the process of the present invention is a polyacrylamide chemically-modified to provide a polymer consisting essentially of repeating units of the structure:

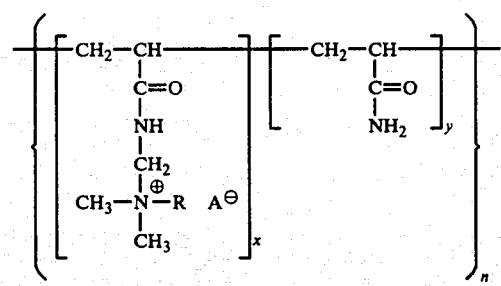

wherein $A^\ominus$ is an anion, R is alkyl of 1-3 carbons or hydroxyalkyl of 2-3 carbons, $x$ is a mol fraction of at least 50 percent, $y$ is a mol fraction of up to about 50 percent and represents unmodified acrylamide units, and $n$ is an integer in the range of about 100 to about 2,000 to provide the chemically-modified polyacrylamide with an intrinsic viscosity in the range of about 0.1 to 0.6 deciliters per gram.

In order to prepare the polymers useful in the process of the present invention, it is first necessary to prepare a low molecular weight polyacrylamide in aqueous solution. By "polyacrylamide" is meant a polymer which consists essentially of repeating units of acrylamide. Although it is generally prefered to employ a homopolymer of acrylamide for optimum results in use, it is also possible to replace part of the acrylamide units with another monomer in amounts which do not interfere with the advantageous performance of the polymer in ore slimes clarification. Other monomers that may replace part of the acrylamide monomer include acrylonitrile, methyl methylacrylate, styrene, diallyldimethylammonium chloride, methacrylamide, N,N'-dimethylacrylamide, and acrylic acid. If an acidic monomer is used, it should constitute less than 10 mol percent of the polymer. If is generally preferable to introduce a high degree of chemical modification in the polyacrylamide and, therefore, the amount of comonomer employed should be minimized in order to achieve such preference. The polyacrylamide, accordingly, will consist essentially of at least 50 mol percent of acrylamide groups that have been chemically modified to provide quaternized dimethylaminomethyl groups thereon and preferably the balance of unmodified acrylamide groups or of comonomer units that do not adversely affect the performance of the polymer in the clarification of ore slimes. Both unmodified acrylamide units and units derived from another comonomer may be present with the required content of quaternized dimethylaminomethyl acrylamide groups.

In preparing the polyacrylamide, an aqueous solution of about 10 to 50, preferably 15 to 30, more preferably 20 to 25 weight percent of acrylamide, or monomer mixture, is employed. A number of techniques are known which can be employed to provide the desired low molecular weight polymer. Use of initiator contents of at least about 0.1 percent are effective. The use of high reaction temperature such as at least 50° C., preferably about 70° C., to 100° C., is also effective using the initiator content as stated. A chain transfer agent, such as isopropanol, is also effective but is not necessary. In instances wherein an impurity, such as ionic copper, is present, a chelating agent, such as ethylenediamine tetraacetic acid may be used to combine with this impurity. However, the presence of impurities and use of chelating agents is not necessary to prepare the low molecular weight polymer.

Free radical initiators useful at the concentration specified include, for example, ammonium persulfate, potassium persulfate, benzoyl peroxide, bromobenzoyl peroxide, t-butyl hydroperoxide, and hydrogen peroxide in the presence of ferrous ion.

As indicated, the initiated polymer solution is heated to 50° C., or higher, and held at the selected temperature until a polymer of desired molecular weight is obtained. The polyacrylamide should have a degree of polymerization in the range of about 100 to 2,000. In the case of a homopolymer of acrylamide, this will correspond to a molecular weight of about 7,000 to 140,000. After the desired polyacrylamide is provided, the reaction solution is cooled to about 40° C. to effect chemical modification with formaldehyde and dimethylamine.

Formaldehyde may be used as a 20 to 60 weight percent aqueous solution and dimethylamine is used as a 20 to 65 weight percent aqueous solution. The molar amount of formaldehyde employed must be sufficient to chemically modify enough acrylamide groups to provide at least 50 mol percent of modified acrylamide groups in the final polymer but the amount of formaldehyde used may be sufficient to provide a polymer consisting essentially of modified acrylamide groups, preferably a polymer containing 60–90 mol percent of modified acrylamide groups. The amount of dimethylamine employed in the chemical modification of the acrylamide groups will constitute the molar equivalent amount of dimethylamine plus about a 1 to 10 mol percent excess, preferably about 5 mol percent excess. The reaction to provide chemical modification is preferably conducted at about 40° C., for sufficient time to complete the reaction, generally in about two hours. Temperature and appropriate time modifications may be made in accordance with conventional procedures for providing this chemical modification, which is also called Mannich base formation.

After the reaction with formaldehyde and dimethylamine is complete, the reaction product is quaternized with an alkylating agent to a pH in the range of about 4 to 7. Preferred alkylating agents are dimethyl sulfate, and methyl chloride but other alkylating agents may be used. The quaternization is preferably carried out to involve essentially all of the dimethylaminomethyl groups provided but complete reaction is not required so long as the minimum quantity of quaternized groups is provided. In the event that all of the dimethylaminomethyl groups are not quaternized, the unquaternized dimethylaminomethyl acrylamide will represent a part of the polymer composition. With respect to the individual steps of polymer preparation, chemical modification of the polyacrylamide to provide Mannich base modification and quaternization of the reaction product, the conditions of reaction and useful reactants are known. The process of the present invention requires that the molecular weight of the initial polyacrylamide be in the low specified molecular weight range.

The polymer obtained by the above described process is a stable product which contains from about 50 to 100 mol percent of quaternized dimethylaminomethyl acrylamide groups. The degree of polymerization of the chemically-modified polyacrylamide will be substantially the same as that of the starting polyacrylamide since no increase in polymer backbone molecular weight is known to occur as a result of the chemical modification effected. Accordingly, the degree of polymerization of the polymer will range from about 100 to 2,000. As a result of the chemical modification of the polyacrylamide, the molecular weight of the repeating units will be increased depending upon the extent to which chemical modification is effected and, accordingly, the product polymer will have a higher molecular weight than the starting polyacrylamide although the degree of polymerization is unchanged. Also, as a result of the chemical modification of the polyacrylamide, the resulting product will have different rheological properties from those of the starting polyacrylamide and consequently the intrinsic viscosity values of the starting and product polymers will differ. The intrinsic viscosity of the polymer used in the process of the present invention should be in the range of about 0.1 to 0.6, preferably about 0.3 to 0.5 deciliters per gram when measured in 3 molar sodium chloride at 30° C.

The ore slimes which are effectively clarified by the polymers of the present invention are those which contain up to about 100,000 parts per million of suspended inorganic solids of a particle size of up to about 2 microns. Such ore slimes arise as effluents from processing ores to separate valuable minerals therefrom. The slimes will contain small portions of the desired mineral values and gangue materials. Any ore slime that responds to clarification with a cationic polymeric flocculant may be processed by the process of the present invention. The process of the present invention has been found to be particularly effective in the clarification of iron ore slimes.

In processing the ore slimes, two advantages arise. Such processing recovers additional ore values that would otherwise be lost and reduces the suspended solids of the effluent water that must be discharged. The process of the present invention by providing improved clarification of the ore slimes increases the amount of mineral values recovered from the slimes, thus providing an increased yield thereof, and reduces ecological problems arising from discharge of the effluents from ore processing.

In carrying out clarification of a ore slime as defined, an effective amount of a polymer of the present invention is mixed with the slime to be clarified. By "an effective amount" is meant that amount which produces a desirable clarification of the slime being treated. Such amount will vary widely depending upon the nature of the slime being clarified, the nature of the chemically-modified polymer employed, the specific degree of clarification desired, and the like. As a general rule, clarification agents may be used in the range of about 0.1 to 1,000 parts per million (ppm) based on the solids content of slime being processed. The polymers of the present invention have generally been found to be effective in the range of about 0.5 to 100 ppm, same basis.

After the chemically-modified polymer has been mixed with the slime being treated, small absorbent flocs involving part of the suspended solids will immediately form. These flocs, because of their nature, can be kept in suspension by application of suitable agitation, usually slow speed, and while in suspension will adsorb additional suspended solids to effect a greater degree of clarification than would be the case if the initial flocs were immediately settled and the supernatant liquor separated. The duration of time over which the initial flocs are maintained in suspension will vary widely depending upon the nature of the slimes being clarified and the content of solids therein, the particular polymer employed in clarification, the extent to which clarification is desired, and the like. It is generally desired to remove a substantial amount of the suspended solids remaining in the slimes being clarified by adsorption by the initial flocs formed. Preferably, the suspendible flocs are maintained in suspension until the turbidity of the treated water is sufficiently clarified to provide a residual Jackson turbidity value of less than about 350.

After the suspendible flocs have adsorbed a suitable amount of the remaining solids in suspension, the resulting flocs are allowed to settle, thus providing supernatant clarified water and a sediment of flocculated inorganic solids. The clarified water may be decanted or otherwise recovered from the sediment in accordance with conventional procedures involving the processing equipment employed. The water obtained by use of the clarification process of the present invention will have a lower residual turbidity than water clarified by equal amounts of other polymer flocculants, an equal residual turbidity at a lower dosage of polymeric flocculant than required with other commercially available polymeric flocculants or the cost-performance requirements for the desired level of clarification will be substantially lower for the process of the present invention than for other processes.

The invention is more fully illustrated in the examples which follow wherein all parts and percentages are by weight unless otherwise specified. The examples are not to be construed as limitations on the scope of the claims.

In evaluating a possible candidate for use as a clarifying agent for ore slimes or tailings, there are several procedures that may be employed. A convenient method involves a laboratory procedure that is conveniently performed and, when conducted in conjunction with agents known to be effective, can be used to suggest agents for further testing under actual use conditions. Alternatively, the agents can be tested directly under use conditions, but such testing requires large quantities of test agents and can lead to unsuccessful results with large quantities of slimes that would require additional treatment for proper discharge into the environment or for recycle in processing. Therefore, it is generally desirable to run laboratory screening tests to ensure at least some degree of success in an actual run under use conditions.

The tests given in the examples which follow are of the laboratory screening type but the results obtained in actual use trails correlate well with the screening results, best results in the laboratory being consistently confirmed in actual use. The tests are described below under descriptive headings.

STATIC TEST

In this test, a specific amount of the clarifying agent is added to 1000 milliliters of the ore slime in a graduated cylinder and the contents are rapidly mixed by inverting the cylinder quickly several times. Then the cylinder is set upright in a stationary position and a timer started. The contents of the graduate are watched as a solids level appears below a clarified supernatant liquor. A line of demarcation will appear above which the clarified liquor forms. Timing is continued until the line of demarcation drops to the 500 ml. mark or such other mark as may be designated. The time required to reach the specified level is recorded as the settling rate for the given level and the clarity of the supernatant is then determined. These tests are generally run using various dosages of test agent and from the results can be determined the minimum residual turbidity associated with a test agent and the dosage required for a particular residual turbidity or a given settling time can be obtained.

The static test indicates two properties of a clarifying agent, the rate at which it effects settling and the extent to which it effects clarification. The ideal clarifying agent would be one which provides the maximum clarification in the minimum settling time. However, in practice it is generally found that those agents that provide the fastest settling rates provide somewhat less than maximum clarity. As a result it is generally necessary to comprise between fastest settling rate and maximum clarity. If clarifier capacity is limited, a compromise in clarity is generally made to obtain faster settling rate. If clarifier capacity is adequate, a compromise in settling rate is generally made to obtain maximum clarity.

DYNAMIC TEST

In this test, the action of a commercial clarifier is simulated. The ore slime is placed in a container supplied with agitation to stir the slime. A given dosage of clarifying agent is added to the slime and agitation at 100 revolutions per minute is carried out for 45 seconds, after which agitation is reduced to 30 rpm and maintained for 3 minutes. After agitation, settling is conducted for 15 minutes. After settling is complete, the clarity of the supernatant liquor is determined. The clarity is indicated by the residual turbidity remaining after clarifying using a Hach Turbidimeter and is expressed in Jackson Turbidity Units (J.T.U.).

The test is run using various dosages of the test clarifying agent and from the results the minimum turbidity remaining is established as well as the dosage required to achieve such value. The effectiveness of a test agent is generally expressed in terms relative to a standard commercial clarifying agent.

In the dynamic tests which are illustrated herein, the standard clarifying agent was the reaction product of dimethylamine and epichlorohydrin having a molecular weight of 75,000. The minimum turbidity value reached with this agent for the ore slime evaluated was 8.0 JTU and was achieved at a dosage of 4 ppm based on the solids of the slime. For comparison purposes, the dosage required to provide a minimum turbidity that is 80% of that of the standard agent, i.e., 6.4 JTU, was determined and the dosage given is converted to a relative value, assigning the dosage of the standard agent a value of 1.0.

EXAMPLE 1

The following example illustrates a process for manufacturing a polymer containing aminomethylated acrylamide groups quaternized with dimethylsulfate.

226 pounds of deionized water, 0.087 pounds of ethylene diamine tetraacetic acid, disodium dihydrate salt and 0.87 pounds of isopropyl alcohol are charged to a clean reactor which is then sealed. Agitation is started and the charge is heated to 70±2° C. under a stream of nitrogen. At 70° C., a 5.16 weight percent aqueous solution of ammonium persulfate (i.e., 15,000 ppm based on acrylamide) is added as rapidly as possible, the temperature is readjusted to 70° C. if necessary, and then a 50 weight percent aqueous acrylamide solution is metered in during 2 hours, while maintaining the temperature at 70±2° C. The amount of acrylamide charged is calculated to give a 20 weight percent aqueous polymer solution. After all the acrylamide has been added, the batch is held at 70° C. for another hour in order to complete the polymerization, then the nitrogen flow is stopped and isopropyl alcohol is distilled off at a batch temperature of 70–75° C. and a pressure of 225 mm. Hg. Distilling off 0.8 to 0.9 weight percent of the batch load removes 90–95 weight percent of the isopropyl alcohol as a 22 weight percent aqueous solution (Sp. Gr. 0.967). After reducing the batch to a temperature below 50° C., the batch weight is adjusted by adding an amount of deionized water equal to the weight of isopropyl alcohol solution removed during stripping. Then a premixed solution of 100 mole percent each of formaldehyde and dimethylamine based on the amount of acrylamide containing 5 mole percent excess dimethylamine is added as rapidly as possible. The dimethylamine-formaldehyde solution should be premixed and cooled below 40° C. After holding for two hours, the batch temperature is readjusted to 35° C. and then 100 mole percent of dimethylsulfate based on the amount of dimethylamine is pumped in as rapidly as possible while maintaining the batch at 35 to 40° C. to a final pH of 6.0±0.2. After the dimethylsulfate has been added and the pH is stable at pH 6.0±2.0, the batch is drummed off.

EXAMPLE 2

The following example illustrates another process for manufacturing a polymer of this invention without the use of a chain transfer agent and without purging the reactor with nitrogen.

A. Preparation of the Polyacrylamide Backbone 738 lb. deionized water and 0.38 lb. EDTA (disodium dihydrate, 1000 ppm on monomer) are charged to a clean reactor and the pH is adjusted to 4.5 with 10% sulfuric acid solution. The reactor is sealed and the batch is heated to reflux during 1 hour. After 1 hour, 0.22 lb. of ammonium persulfate initiator is added and then 2.02 lb. of the initiator and 941 lb. of 39.7% acrylamide monomer solution (at pH 4.3) are metered in simultaneously during 90 mins. while maintaining steady reflux. After the monomer and initiator solutions have been added the batch is held at reflux for 30 minutes to complete the polymerization and then the batch temperature is reduced to 35–40° C.

B. Preparation of the Aminomethylated Polyacrylamide Quaternized Polymer.

At 35° C., a premixed solution of 532.75 lb. of a 37 weight percent formaldehyde solution and 779.88 lb. of a 40 weight percent dimethylamine solution (1:1:1.05 mole ratio of amide: formaldehyde: amine) is added as rapidly as possible with no cooling. The batch is held 3 hours. Then the batch temperature is reduced to 20° C. and 698 lbs. of dimethylsulfate is metered in at a temperature of 35° C. until the pH is reduced to 5±0.5. After the dimethylsulfate has been added and the pH is stable the batch may be drummed off.

EXAMPLE 3

An iron ore slime containing mostly colloidal silica and clay and having a 2–3% solids content was employed to compare settling rates and supernatant turbidities of a polymer of the invention and a highly effective prior art flocculant. To one liter samples of the slime in separate one-liter graduated cylinders were mixed either 2 or 4 milligrams of the polymer of test. The time for the suspended solids to settle below the 500 milliliter mark of the cylinder was determined along with the Jackson turbidity value of the supernatant liquor. The polymer of the present invention was made by the procedure of Example 1 and had an intrinsic viscosity of 0.25 deciliters per gram at 30° C. in 3M NaCl which corresponds to a polyacrylamide of molecular weight 45,000 as the starting polymer. The prior art polymer is described in U.S. Pat. No. 3,894,947 and is the reaction product of dimethylamine and epichlorohydrin having a molecular weight of 45,000. The results are given in Table I.

TABLE I

| SETTLING OF IRON ORE SLIMES | | | |
|---|---|---|---|
| Polymer | Dosage | Settling Rate[1] | Supernatant Turbidity[2] |
| Example 1 | 2mg/l | 138 | 320 |
| Example 1 | 4mg/l | 85 | 300 |
| Prior Art | 2mg/l | 144 | 330 |
| Prior Art | 4mg/l | 97 | 300 |

Notes:
[1] Seconds to 500 ml mark
[2] Jackson Turbidity Units

The results show that polymers of the present invention provide faster settling rates at the same or reduced supernatant turbidity than do the prior art polymers.

EXAMPLE 4

In this example, a series of runs were made following the procedure of Example 3 but using polymers of higher molecular weights. The polymer of the invention was again prepared by the process of Example 1 but had an intrinsic viscosity of 0.34 deciliters per gram at 30° C. in 3M NaCl which corresponds to a polyacrylamide of molecular weight 75,000 as the starting polymer. The prior art polymer was as in Example 3 except that it had a molecular weight of 75,000. In the various runs, a series of concentrations of each of the two polymers was evaluated to determine the settling time for the suspended solids to reach the 500 ml mark and the supernatant clarity achieved. From the various data obtained, the relative doses of the two polymers necessary to achieve equal settling time to the 500 ml mark and a supernatant turbidity of 190 JTU was determined. The results are given in Table II.

TABLE II

| RELATIVE POLYMER DOSAGES | | |
|---|---|---|
| | Relative Dosages For | |
| Polymer | Equal Settling Rates | 190 JTU Supernatant Turbidity |
| Example 1 | 1.0 | 1.0 |
| Prior Art | 1.7 | 2.0 |

The results again show that the polymers of the present invention are superior to the prior art polymer in dosage requirements for a given settling rate or a given supernatant turbidity.

EXAMPLE 5

In this example, a series of polymers differing only in molecular weight were evaluated in clarifying iron ore slimes obtained from an iron mine in Michigan. In each instance the polymer was obtained by the process of Example 1 except that the molecular weight of the intermediate polyacrylamide differed. In each test, the polymer was employed at 50 parts per million parts of suspended solids. The results obtained and the polymer viscosities are given in Table III.

Table III

STATIC CLARIFICATION TESTS

| Polymer Intrinsic Viscosity[1] (dl/gm) | Settling Time To 350 ml. (minutes) | Supernatant Clarity (JTU) |
|---|---|---|
| 0.28 | 3.40 | 43 |
| 0.51 | 2.77 | 57 |
| 0.75 | 2.45 | 66 |
| 1.53 | 2.00 | 84 |
| 2.00[2] | 1.80 | 120 |

Notes:
[1] determined in 3M NaCl at 30° C.
[2] precise value not available

These results show that as the intrinsic viscosity of the polymer increases, the settling time decreases while the supernatant clarity increases. These results demonstrate that the fastest settling time leaves much to be desired with respect to supernatant clarity.

EXAMPLE 6

In this series of runs, the Dynamic Test was followed as described. As the standard flocculant was employed the reaction product of dimethylamine and epichlorohydrin having a molecular weight of 75,000. As test agents were used polymers prepared according to Example 1 except that the molecular weight of the intermediate polyacrylamide varied. The standard polymer was used at a dosage of 4 parts per million parts of suspended solids and provided a residual turbidity of 8 J.T.U. measured with a Hach turbidimeter as the minimum value. The test agents were run at various dosages and from these runs the dosages required to provide a residual turbidity that was 80% of that of the standard agent were determined. This represents an actual turbidity of 6.4 JTU and an improvement of 125% compared to the standard. The various results and pertinent data are given in Table IV.

TABLE IV

CLARIFICATION OF IRON ORE SLIMES

| Polymer | Intrinsic Viscosity[1] | Relative Dosage | Supernatant Clarity (JTU) |
|---|---|---|---|
| Standard | — | 1.00 | 8.0 |
| Example 1 | .22 | .3 | 6.4 |
| " | .39 | .15 | 6.4 |
| " | .41 | .19 | 6.4 |
| " | .45 | .19 | 6.4 |
| " | .54 | .21 | 6.4 |

Note:
[1] dl/g. measured in 3M NaCl at 30° C.

These results show that polymers of the present invention provide a lower supernatant clarity than the prior art polymer and provide such clarity at a small fraction of the dosage requirements of the prior art clarifying agent. It can be seen that greatest efficiency of the polymer type of the invention is below an intrinsic viscosity of about 0.5 dl/l.

We claim:

1. A process for clarifying iron ore slimes containing up to about 100,000 parts per million of suspended inorganic solids with a particle size of up to about 2 microns which comprises mixing with said slimes from about 0.1 to 1,000 parts per million, based on the solids content of said slimes, of a water soluble polymer consisting essentially of a polyacrylamide having a content of at least about 50 mol percent of amide groups chemically-modified to contain dimethylaminomethyl groups, the dimethylaminomethyl groups being further modified by quaternization with an alkylating agent, the chemically-modified polyacrylamide having an intrinsic viscosity in the range of about 0.1 to below about 0.5 deciliters per gram measured in 3M NaCl at 30° C. to form suspendible flocs from a portion of the solids present, maintaining said suspendible flocs in suspension in said water until a substantial portion of the remaining solids are adsorbed thereo; and thereafter settling the resulting flocs formed.

2. The process of claim 1 wherein said polyacrylamide contains at least 60–90 mol percent of modified acrylamide groups.

3. The process of claim 1 wherein the dimethylaminomethyl groups are modified by quaternization with dimethyl sulfate.

4. The process of claim 1 wherein the intrinsic viscosity of said chemically-modified polyacrylamide is in the range of about 0.3 to below about 0.5 dl./g.

5. The process of claim 1 wherein from 0.5 to 100 ppm of said chemically modified polyacrylamide are mixed with said slimes.

* * * * *